United States Patent [19]

Vincent

[11] Patent Number: 4,806,750
[45] Date of Patent: * Feb. 21, 1989

[54] COLOR IMAGER UTILIZING NOVEL TRICHROMATIC BEAMSPLITTER AND PHOTOSENSOR

[75] Inventor: Kent D. Vincent, Cupertino, Calif.

[73] Assignee: Hewlett-Packard Company, Palo Alto, Calif.

[*] Notice: The portion of the term of this patent subsequent to Nov. 24, 2004 has been disclaimed.

[21] Appl. No.: 124,225

[22] Filed: Nov. 23, 1987

Related U.S. Application Data

[63] Continuation of Ser. No. 847,382, Apr. 2, 1986, Pat. No. 4,709,144.

[51] Int. Cl.$^4$ ............... G01J 3/50; H01J 5/16
[52] U.S. Cl. ..................... 250/226; 350/166
[58] Field of Search ............ 250/226, 578; 358/49; 350/166, 169, 170, 171, 173

[56] References Cited

U.S. PATENT DOCUMENTS

| | | | |
|---|---|---|---|
| 2,392,978 | 1/1946 | Dimmick | 350/166 |
| 2,749,792 | 6/1956 | Kelly | 350/166 |
| 3,498,693 | 3/1970 | Fein et al. | 350/166 |
| 3,659,918 | 3/1972 | Tan | 350/166 |
| 3,753,822 | 8/1973 | Heinrich | 350/166 |
| 4,066,355 | 1/1978 | Helmberger et al. | 250/226 |
| 4,185,894 | 1/1980 | Hilton et al. | 350/166 |
| 4,408,825 | 10/1983 | Stelmack | 350/166 |

Primary Examiner—David C. Nelms
Assistant Examiner—William L. Oen
Attorney, Agent, or Firm—William W. Cochran, II

[57] ABSTRACT

The trichromatic beamsplitter consists of composited dichroic beamsplitter plates that separate a projected image into its three color components with spacial as well as spectral precision. The three linear array photosensor comprises a monolithic sensor having three parallel photodiode arrays spaced precisely to accept the color component images of the trichromatic beamsplitter.

22 Claims, 11 Drawing Sheets

COLOR IMAGER UTILIZING NOVEL TRICHROMATIC BEAMSPLITTER AND PHOTOSENSOR

CROSS REFERENCE TO RELATED APPLICATION

This is a continuation of application Ser. No. 847,382 filed Apr. 2, 1986, now U.S. Pat. No. 4,709,144.

BACKGROUND OF THE INVENTION

Color imagers include color video cameras and color scanners for commercial printing. Color imagers transform color pictures into machine readable data. This is accomplished by dividing a color image into many small portions called pixels. The color imager separates light from each pixel into red, blue or green light. Numbers assigned to each pixel of the color image represent the red, blue, and green light. A fast, high resolution, accurate color imager would enhance the usefulness of computers and automate numerous tasks. For example, computers can print and display color images. However, the lack of fast, accurate, and high-resolution means for transferring color images into a computer limits the use of this capability.

In the early prior art, discrete optical components, such as beamsplitters and color filters, separate the color components of an image. Dichroic beamsplitters have been widely used due to their combined function as both beamsplitter and filter. Typically, color separation is achieved by placing two discrete dichroic beamsplitters in the optical pathway between the projection lens of the imager and its photosensors. The first dichroic beamsplitter reflects a first spectral band (e.g., green) to the first photosensor while transmitting the remaining spectral bands to the second dichroic beamsplitter. The second dichroic beamsplitter reflects a second band (e.g., red) to a second photosensor while transmitting the remaining spectral band (e.g., blue) to the third photosensor. The disadvantage of this approach is that the respective dichroic beamsplitters and photosensors must be precisely aligned; otherwise, the color components will not have the proper optical coincidence. The costly alignment process limits the use of this prior art color separator.

With the advent of low-cost, solid-state photodiode array photosensors, various attempts have been made to develop low cost color separation techniques for color scanners and video cameras.

Solid-state, photodiode arrays with integral color filters have been commercialized by Hitachi, Toshiba, Sony and RCA. These devices employ a two-dimensional array of photodiodes on a single silicon substrate. The array is coated with a gelatin layer, into which color dyes are selectively impregnated, using standard masking techniques. Each photodiode is, thus, given an integral color filter, e.g., red, green or blue, according to a color pattern which is repeated throughout the array. The same technology has been applied to one-dimensional photodiode array sensors for line scanners. The latter devices have been commercialized by Toshiba and Fairchild.

Figure 1:
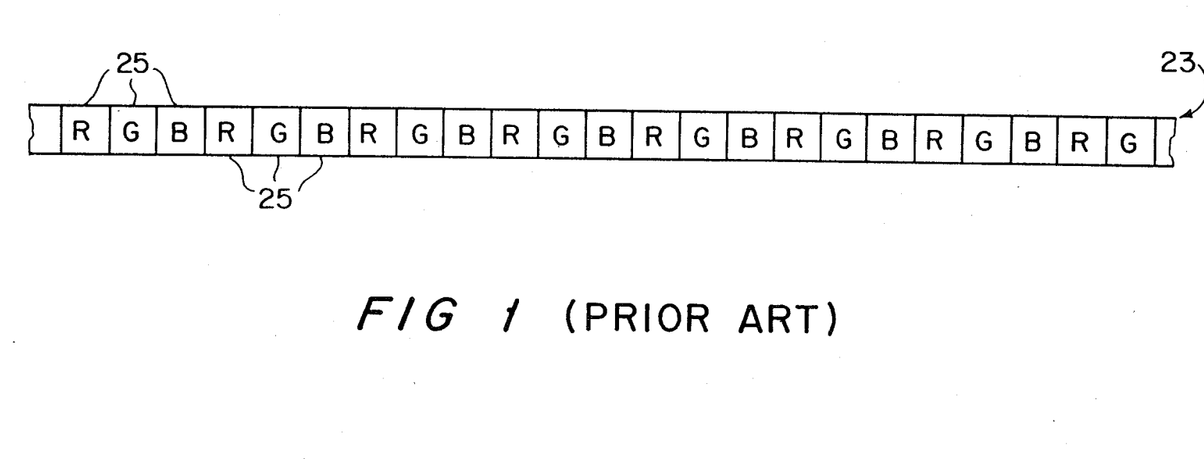
FIGS. 1 is a prior art color sensor.

A prior art color imager using photodiode arrays is shown in FIG. 1. The single linear photodiode array 23 has individual organic dye filters impregnated over each photodiode in a repetitive red, blue and green pattern. Color separation, the breaking down of a color image into red, blue and green light, is achieved by focusing the light beam on the array, as shown in FIG. 1. One red, green and blue photodiode grouping 25 provides information to one color pixel This prior art technique has several disadvantages. Since three photodiodes supply information to one pixel, the pixel resolution is reduced to one-third. For accurate color imaging, the luminance detail and chroma of a given color pixel from the original image must be resolved by three optically coincidental photosensor elements However, the prior art photodiode arrays do not have color-coincidence. The red light is detected from one location, green from another, and blue from a third location. In addition, two-thirds of the light incident on each photodiode is lost by filter absorption (e.g., a red filter absorbs green and blue spectral bands). In order to increase the resolution, the array 23 must be lengthened or the photodiode area must be decreased. However, either of these approaches to increase the resolution will proportionately decrease scan speed. Also, the dye filters have less color band purity than dichroic filters. The prior art approach desaturates color sensitivity and is otherwise spectrally inaccurate.

Another prior art color imager using photodiode arrays has a rotating color wheel composed of colored filter segments. The lens focuses a line image of the original object on a linear photodiode array. The rotating color wheel filters the projected line image in a repeating color sequence, e.g., red, green, blue. The signal for each color component of a given line image is stored digitally until all three color components have been detected. The signals are then reordered in memory to assign three color values to each pixel in the line image.

The color wheel color separation technique has the advantages of utilizing the full resolution of the photodiode array as well as utilizing dichroic filters. However, it has several disadvantages. The scan speed is one-third of the integral sensor/filter scan speed, since only one of three colors is detected at a time. Also, further speed reduction results from transitions between filter segments during rotation of the wheel. When the color wheel and scan line are continuously driven, as opposed to synchronously "stepped", the effective resolution of the photodiode array is diminished in the scan direction by the movement of the scan line through the color cycle of the color wheel. Another disadvantage is the size of the color wheel which limits device extensibility. Page-width "contact" or "traversing head" type scanner embodiments become impossible or unwieldy. Further, this prior art device is burdened with a large moving mechanism and the control of this mechanism.

The Sharp Corporation of Japan has introduced a third prior art color separation technique for color document scanning. The Sharp scanner employs a single photodiode array with three sequentially-fired colored fluorescent lamps (e.g., red, green, blue), as the imaging light source. The sequence of signals obtained by the photodiode array is directly analogous to the color wheel color separator. That is, the input to the photodiode array is a sequential input of the red, green and blue components of a given original line image. Likewise, the photodiode signals for each color component are digitally stored and reordered in memory at the end of each color cycle.

Like the color wheel color separator, the tri-colored lamp approach provides imaging means that utilize the full resolution of the photodiode array. Several shortcomings, however, limit the speed and color integrity of the imager. In order to obtain correct color separation, the light output from each lamp should be extinguished before the firing of the next lamp in sequence; blended lamp output produces undersaturated color detection. Scanning speed, as a result, is limited by the persistence time of the phosphors utilized in each fluorescent lamp or the ability to dynamically subtract out the signal produced by the decaying light output of a previously fired lamp. Color integrity is further limited by the selection of phosphors having persistence values sufficiently low to meet commercial scan speed specifications. Typically, external absorption filtering of the lamps is required to obtain the desired spectral characteristics of each lamp output. As with the color wheel color separator, when the scan line is continously driven, as is desirable for scan speed, the effective resolution of the photodiode array is diminished in the scan direction by the movement of the scan line through the color cycle of the sequentially-fired lamps. The size and bulk of the optical system comprising the three lamps likewise restricts device extensibility toward "contact" or "traversing head" type scanner applications.

SUMMARY OF THE INVENTION

Figure 3:
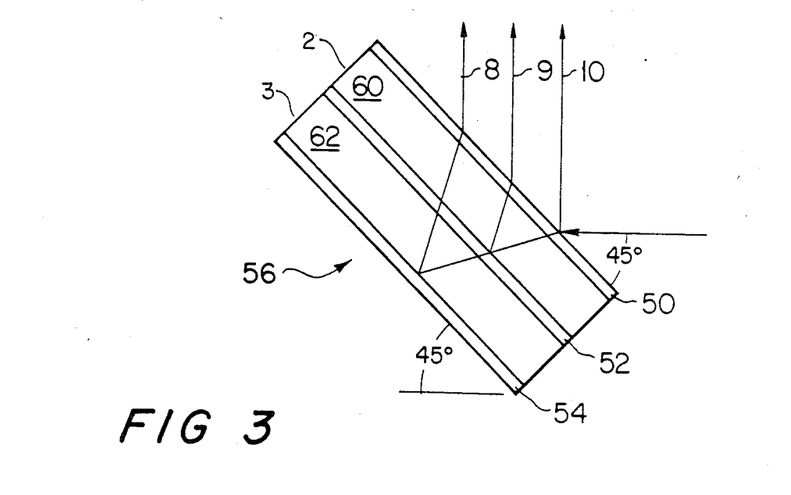
FIG. 3 shows a trichromatic beamsplitter made from the dichroic beamsplitter plates shown in FIGS. 2A and 2B.
Figure 6:
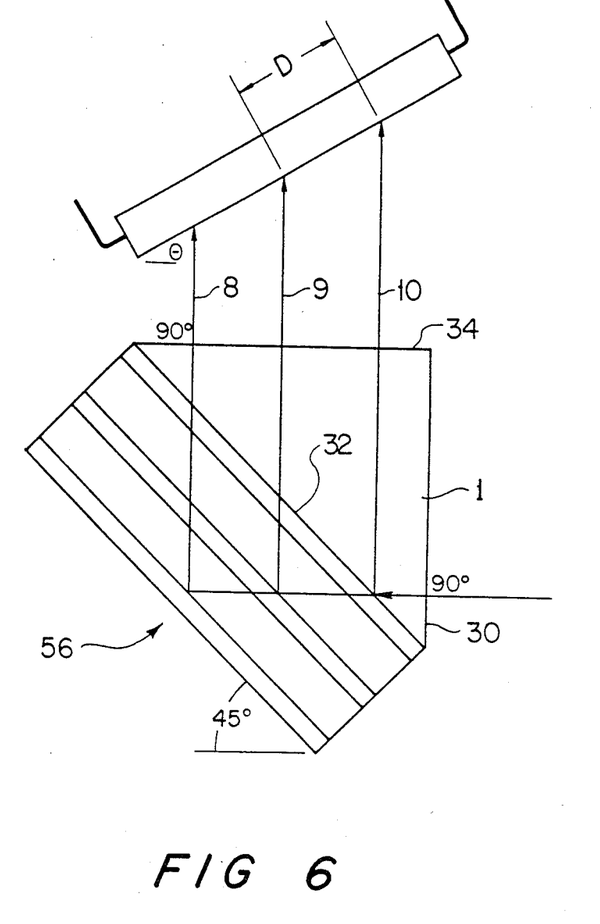
FIG. 6 shows an alternate embodiment of the trichromatic beamsplitter shown in FIG. 5A with a prism attached.
Figure 7A:
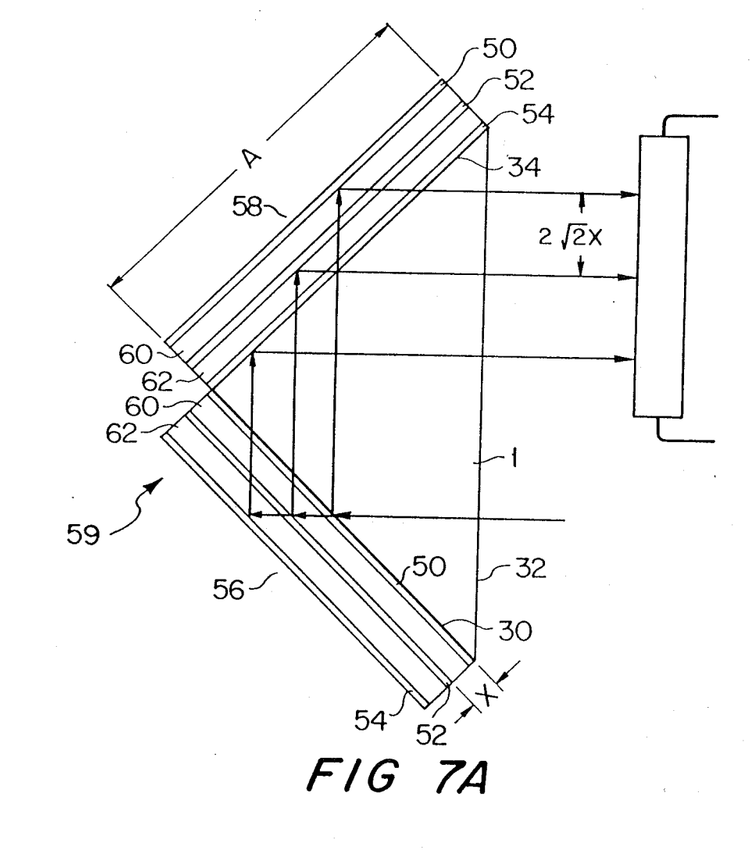
FIG. 7A shows the dual trichromatic beamsplitter with an attached prism.

The present invention is a novel composited trichromatic beamsplitter and photosensor. The trichromatic beamsplitter consists of composited dichroic beamsplitter plates that separate a projected image into its three color components with spacial as well as spectral precision. The three linear array photosensor comprises a monolithic sensor having three parallel photodiode arrays spaced precisely to accept the color component images of the trichromatic beamsplitter. One embodiment of the trichromatic beam-splitter 56 is shown in FIG. 3. Another version of the trichromatic beamsplitter 56 is shown in FIG. 6. FIG. 7A shows trichromatic beamsplitter 59.

The present invention is compact, inexpensive and easy to manufacture. Another advantage of the present invention is the color coincidence within a pixel. That is, each portion of a pixel generates all three color components. The invention also features accurate spectral and spacial separation. Accurate spectral separation is achieved partially through the dichroic filters and partially through a lamp which is spectrally-tailored to meet the requirements of the color imager system. Accurate spatial separation is achieved through the accuracy of the plate thicknesses. This invention also features high resolution and high-scan speed. Each pixel generates all spectral components and the photosensor detects the spectral components in parallel.

The present invention is extremely efficient by comparison to conventional filtration techniques. Essentially all of the incident light striking the beamsplitter in this design is collected by the photosensor(s). A conventional filter absorbed typically two spectral bands to transmit one. Since essentially all of the visible light is utilized n the trichromatic beamsplitter, maximum scan speed is achievable for a given optical system.

The present invention does not require costly optical alignment. The dichroic coatings are precisely separated by glass plates in the manufacturing process. This separation corresponds to the separation of the photodiode arrays of the photosensor. The present invention can have many different embodiments. The object whose image is being created may be nearby or at a distance. The trichromatic beamsplitter may have a length equal to page width or it may be very short. Instead of separating a color image into three colors, it may separate them into many colors. Thus, the present invention presents an accurate, inexpensive, and flexible color separator.

DETAILED DESCRIPTION OF THE INVENTION

In the present invention, precise spectral and spatial separation of a projected line image is achieved through composited dichroic beamsplitters as shown in FIG. 3. Each beamsplitter 2, 3 consists of a precisely ground and polished glass plate coated on one or both faces with a selected multilayer dielectric interference optical filter coating, 50, 52, 54 (hereinafter referred to as dichroic coating) At each dichroic coating 50, 52, 54, incident light is either reflected or transmitted according to wavelength with negligible absorption loss. The composition of the dichroic coatings 50, 52, 54, can be designed for accurate band pass filtration.

Dichroic coatings are well known in the art of optics. These coatings typically consist of 20 or more alternating high and low refractive index optical layers vacuum-deposited to an accumulative thickness of, typically, about 3 microns on a glass surface. The material composition and method of deposition can be designed for very accurate spectral bandpass filtration A variety of dichroic filters, consisting of a single glass plate front surface coated with a dichroic coating, are commercially available from a variety of sources (e.g., Optical Coating Laboratory, Inc., located in Santa Rosa, Calif.).

Figure 2A:
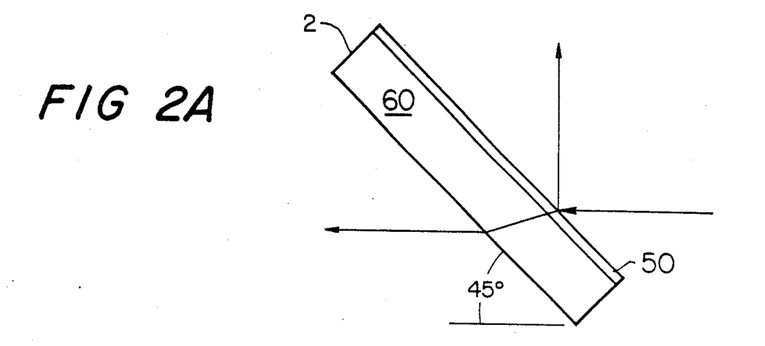
FIGS. 2A and 2B show dichroic beamsplitter plates.
Figure 2B:
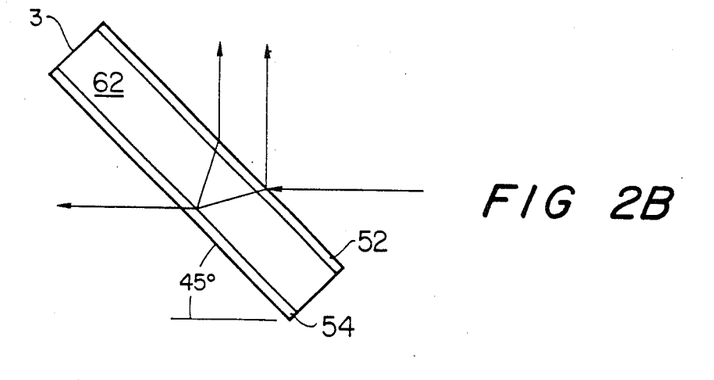

Dichroic beamsplitter plates suitable for the invention are shown in FIGS. 2A and 2B. The beamsplitter plate 2 shown in FIG. 2A is designed such that incident light, striking its dichroic coating 50 at a particular angle, in which 45 degrees is an example reflects blue light (spectral band approximately 400-500 nm.) while transmitting red light and green light.

Beamsplitter 3 shown in FIG. 2B is coated on both faces with dichroic coatings 52 and 54 such that incident light striking a first dichroic coating 52 at, a particular angle, in which 45 degrees is an example reflects the red spectral band (e.g., 600-700 nm.) while transmitting the blue and green bands. The green light striking a second dichroic coating 54 at a particular angle, in which 45 degrees is an example, is reflected. The reflected green light is caused to pass back through the glass plate 62 and through the first dichroic coating 52 at the particular angle, in which 45 degrees is an example. As shown in FIG. 2B, the red and green components of the incident light are reflected at twice the incident angle, in which 90 degrees is an example. The reflected red and green components are parallel and separated from each other by a distance determined by the glass plate 62 and dichroic 52, 54, thickness and their refractive indexes coatings A trichromatic separation of an incident light beam can be achieved through a composite of beamsplitter plates 2 and 3, as shown in FIG. 3. Each of the three spectrally-tailored dichroic coatings 50, 52, 54, are separated by a glass plate 60, 62 thickness. Incident light striking the first dichroic coating, and having an optical axes oriented from the dichroic coating at a particular angle, in which 45 degrees is an example is filtered such that the blue spectral band is reflected. The unreflected bands (red and green) are transmitted to a second dichroic coating 2 located between the glass plates 60 and 62. Coating 52 reflects the red spectral band The remaining band, the green spectral band, is reflected from the third dichroic coating 54. The red and green spectral components exit the composite beamsplitter 56 through the glass plates 60, 62 and dichroic coatings 50, 52, essentially unperturbed. Thus separated, red, green, and blue components of the incident light beam are reflected at twice the angle of the incident beam 90 degrees is an example beam with a parallel spatial separation which is solely determined by the thickness of the glass plates 60, 62, and dichroic coatings 50, 52, and 54, and their refractive indexes The order in which the reflected color bands have been presented is by example only. It is further obvious that a mirror coating could be substituted for the third dichroic coating 54, since only the third remaining color component reaches that coating interface.

Figure 4A:
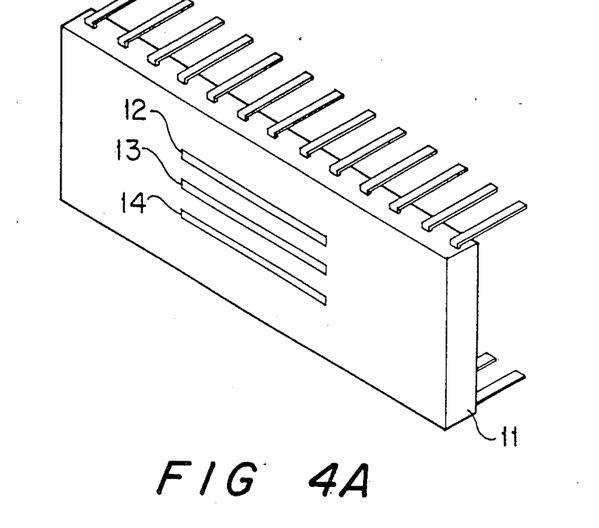
FIGS. 4A and 4B show the photosensor integrated circuit and photosensor arrays, respectively, used to detect light beams from the trichromatic beamsplitter shown in FIG. 3.
Figure 4B:
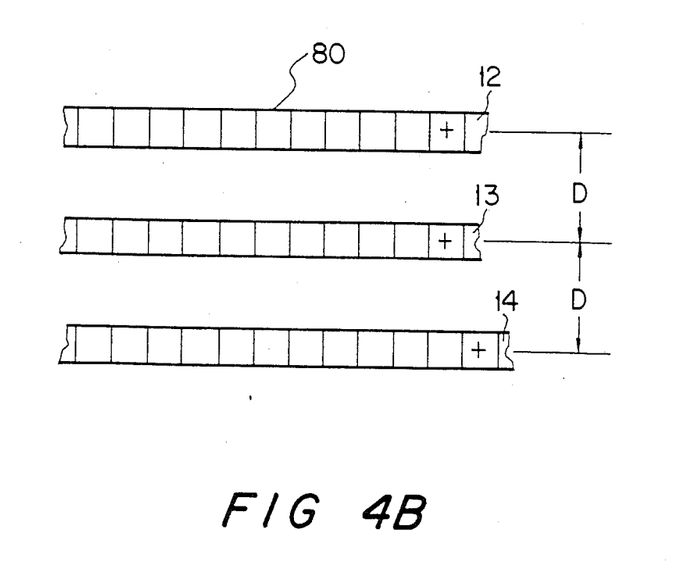
Figure 5A:
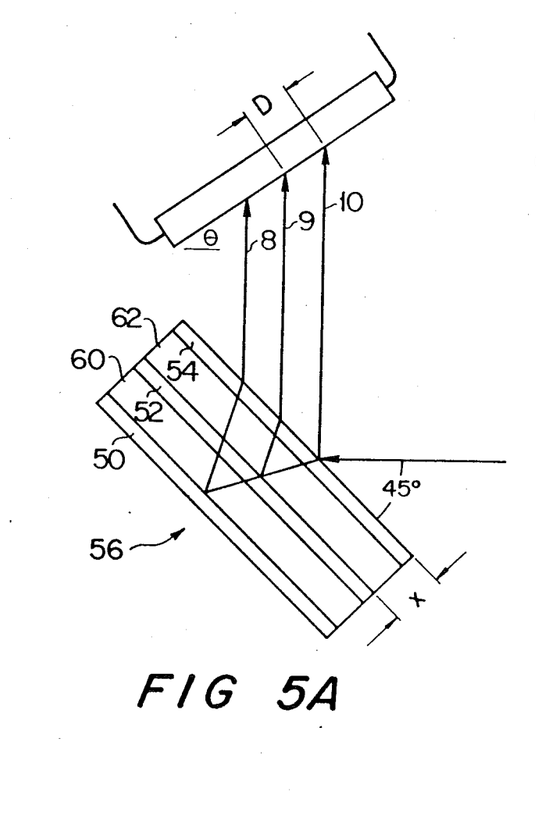
FIG. 5A shows the trichromatic photosensor shown in FIG. 4A positioned to detect light beams from the trichromatic beamsplitter shown in FIG. 3.

A suitable photosensor for this invention is shown in FIG. 4A. Photosensor 11 is preferrably a single chip, single package solid state device having three linear photosensor arrays, 12, 13 and 14, precisely aligned and spaced to coincide with the focused line images 8, 9 and 10, respectively, shown in FIGS. 3 and 5A. Such devices can be made using known technologies. For example, numerous photosensor array devices are now commercially available. Most prominent are photodiode arrays with charge-coupled shift registers (CCD photosensors). Such single line CCD photodiode array devices are commercially available from Fairchild Semiconductor, located in Palo Alto, Calif., Toshiba, located in Japan, and other comapnies. The photosensor array devices have commercial resolutions ranging from 128 to over 5000 photoelements per line. The spacing between photoelements typically ranges from 10 to 62 microns. Thus, the design and manufacture of a photodiode array shown in FIG. 4B uses known technologies to produce the three parallel photosensor arrays 12, 13 and 14. A distance "D" separates the photosensor arrays 12, 13, and 14. As shown in FIG. 5A, the distance "D" is related to the separation of the dichroic coatings 50, 52, and 54, and angle $\theta$ of the photosensor 11. The distance between photosensors 12 and 13 does not have to be equal to the distance between photosensors 13 and 14. The three photosensor arrays 12, 13, and 14 have common clock inputs for synchronization. As is well known in the art, integrated circuit photolithography processes are capable of aligning and spacing the three linear photosensor arrays 12, 13 and 14 to submicron precision. The combined spatial precision of the described trichromatic beamsplitter 56 and three photosensor array detectors, 12, 13 and 14, allows accurate coincidence of the detected images with the single line image of the original.

The preferred arrangement of trichromatic beamsplitter 56 and photosensor 11 is shown in an end view in FIG. 5A. Due to the variations in path-length-through-glass between the three separated color components, beamsplitter 56 and photosensor 11 are mounted to have an inclusive angle less than 90 degrees, typically 80 degrees for nominal glass refractive index. This angle is independent of the focal distance between the lens and photosensor. At this inclusive angle, the three separated color components will properly focus on their respective linear photosensor arrays 12, 13 and 14. The spatial separation of arrays 12, 13, and 14 is directly determined by the thickness of the glass plates 60, 62, dichroic coatings 50, 52, and 54, and their refractive indexes. (Standard lens formulas are used to calculate the angle and separation distances.) Trichromatic beamsplitter 56 and photosensor 11 are preferably assembled in a housing that maintains the desired angles and distances, and that consolidates the parts into a single package.

As is well known in optics, a focused light beam transmitted through a glass plate at an angle of incidence other than 90 degrees is subject to oblique spherical abberation. This causes astigmatism. Increasing glass thickness and angle of incidence exacerbate the astigmatism. The red, blue, and green spectral components experience different degrees of degradation due to their different path lengths through the glass and the high angle of incidence (45 degrees). This compromises the focus and resolution of the color separation technique to the extent that the chromatic foci through the trichromatic beamsplitter occur beyond the depth of focus provided by the imaging lens.

In the preferred embodiment, the thickness of the glass plates 60, 62 and dichroic coatings 50, 52, and 54, and the spacial separation of the three photosensor arrays 12, 13, and 14, in photosensor 11 are collectively minimized to render negligible the otherwise optical deficiencies and minimize cost. Since thin glass plates (on the order of 0.1 to 2 millimeter) are difficult to grind and coat without substantial warpage, a preferred method of beamsplitter manufacture will include a thick glass substrate 70, shown in FIG. 5B, from which the trichromatic beamsplitter 56 is built up In this preferred method, the thick glass substrate 70 is ground flat, polished and coated with dichroic coating 54. To the coating 54, glass plate 62 is bonded using an optical cement. The exposed surface of glass plate 62 is then ground flat and polished to provide the desired thickness of coating, cement and glass as measured through the composite. In a like manner, glass plate 62 is coated with dichroic coating 52, then bonded to glass plate 60, at which point the surface of plate 60 is ground and polished to the desired thickness. Finally, dichroic coating 50 is deposited on the exposed surface of plate 60. Using this fabrication method, trichromatic beamsplitter 56 can be manufactured of relatively large glass sheets from which many beamsplitters may be cut at minimum part cost.

An alternate embodiment utilizes a single pair of beamsplitter plates and a single prism. As shown in FIG. 6, the incident light beam is aligned to impinge a first base side 30 of right-angle prism 1 at a normal angle and transmit therein to the hypotenuse face 32 of the prism 1 which the light beam impinges at 45 degrees. The composite beamsplitter 56 of FIG. 3, consisting of beamsplitters 2 and 3, is attached thereto. A trichromatic separation of the red, green and blue spectral components of the incident light beam occurs as previously described. The three reflected component beams re-enter the prism 1 and are directed toward the second base side 34 of the prism. The component beams exit the prism at 90 degrees to its base side 34 and with an optical axis spatial separation (SQRT 2)x where x is the thickness of the glass, optical cement and dichroic coating between two adjacent dichroic coatings Irrespective of the lens used to focus through beamsplitter 56, the three component light beams will focus on a plane oriented at an angle $\theta = \arctan 2(n - 1/n)$ to the second base side 34 of prism 1, where n is the refractive index of the glass prism I and beamsplitter plates (for $n = 1.517$, $\theta = 34.28$ degrees). The three linear array photosensors 12, 13, and 14, as previously described, are aligned on said plane at angle $\theta$ at the location of foci of the three component beams. Trichromatic beamsplitter 56 with the prism 1 allows a 90 degree angle of incidence to glass and chromatic focusing to each sensor array 12, 13, and 14.

In order to align photosensor 11 to be perpendicular to the optical axes of the color-separated beams, the dual trichromatic beamsplitter with prism 59 shown in FIG. 7A is adopted. In this embodiment, the pathlengths-through-glass of the color-separated beams are made equal by the reciprocal arrangement of the trichromatic beamsplitters 56 and 58.

As shown in FIG. 7A, the incident light beam is aligned to impinge the hypotenuse face 32 of right angle prism 1 at a normal angle and transmit therein to a first base side 30 of the prism 1 which the light beam impinges at 45 degrees. The composite beamsplitter 56 of FIG. 3 is attached thereto. A trichromatic separation of the red, green and blue spectral components of the incident light beam occurs as previously described. The three reflected component beams reenter the prism 1 and are directed toward the second base side 34 of prism 1, each separated beam impinging the second base side 34 at 45 degrees incidence. A second composite beamsplitter 58 is attached to the second base side 34 of prism 1. The plates 60, 62 and the dichroic coatings 50, 52, and 54, in beamsplitters 56 and 58 are identical. However, the orientation of the composite beamsplitters 56 and 58, and their multilayer dielectric coatings 50, 52, and 54, on each base side 30, 34 of the prism 1 are reversed so that the path lengths of each component color beam entering and exiting the trichromatic prism beamsplitter 59 are identical. That is, a component color beam, such as blue, reflects off the dichroic coating 50 on plate 60 located on base side 30. Next, the blue component reflects off the dichroic coating 50 on plate 60 located adjacent to base side 34. In a like manner, a red component color beam goes from middle filter 52 to middle filter 52, and the green component reflects off a backside filter 54 to a frontside filter 54 as shown in FIG. 7A. Reflected beams from the trichromatic beamsplitter 58 adjacent to base side 34 are directed out of prism 1. The beams are perpendicular to the hypotenuse side 32 and parallel to the incident light beam. The thickness of the beamsplitter glass plates, 60, 62, and their dichroic coatings 50, 52, and 54, determine the separation of the reflected beams. Thus, the dual trichromatic beamsplitter 59 provides an equal path length through the glass for all color components. Also, the light enters and leaves the prism at a normal angle of incidence.

It is obvious that an alternate embodiment of trichromatic beamsplitter 59 would omit prism 1. Without the prism 1, incident light impinges the beamsplitter 56 and 58 at a particular angle, in which, 45 degrees is an example, creating astigmatic foci at the focal plane of photosensor 11. The degree of effect due to the astigmatism is functional to the depth of focus of the projection lens in the accompanying optical system and the spacial separation of the various dichroic coatings composing the trichromatic beamsplitter. The primary advantage of said alternative embodiment is the removal of glass in the optical path that a lens must otherwise be corrected for.

Figure 8A:
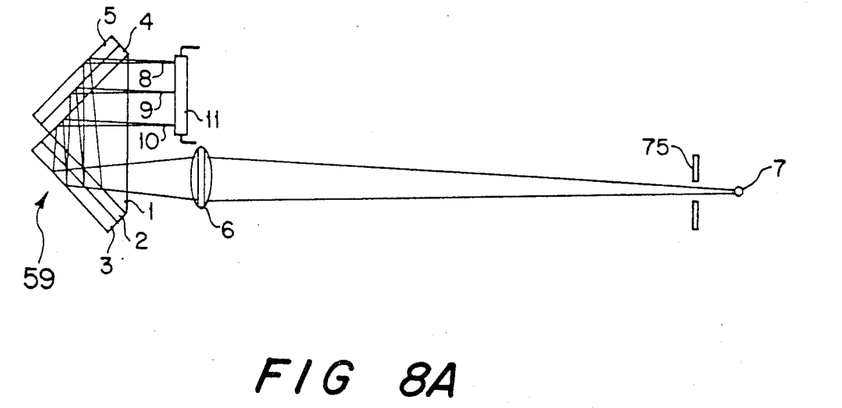
FIG. 8A shows an optical system employing the dual trichromatic beamsplitter with a prism.
Figure 8B:
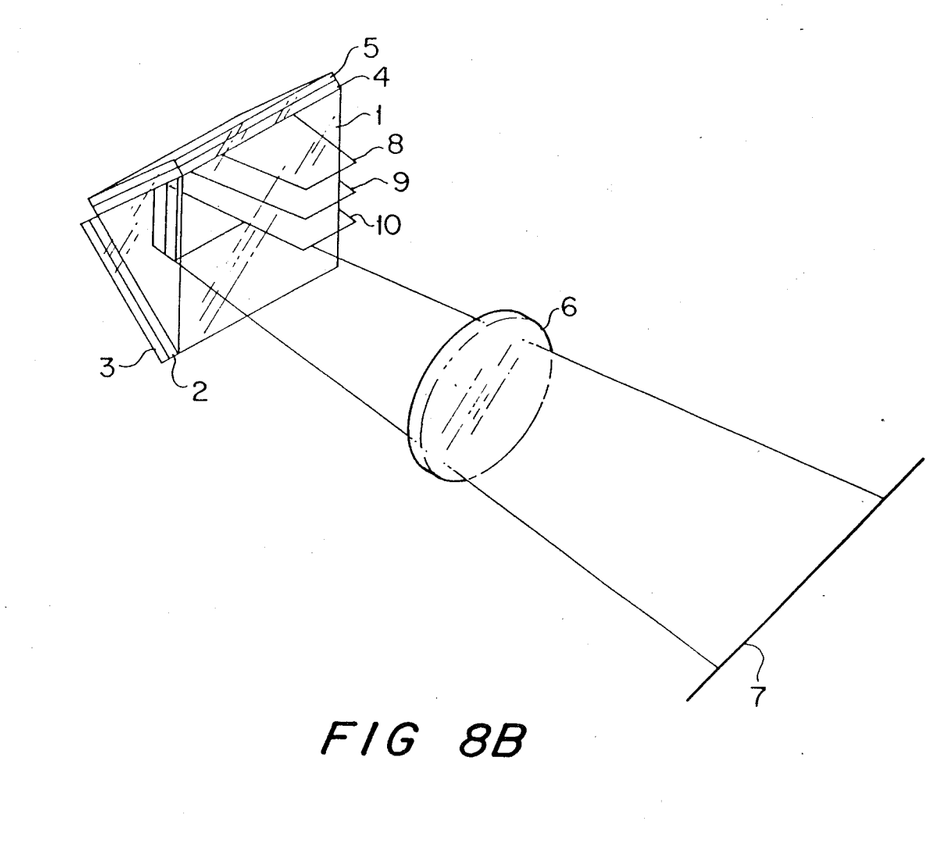
FIG. 8B shows an isometric view of the dual trichromatic beamsplitter with a prism.

By way of example only, an optical system employing the trichromatic beamsplitter 59 of FIG. 7A is shown in FIGS. 8A and 8B. A similar optical system can be employed with the beamsplitters 56, 58, and prismless beamsplitter 59, in FIGS. 5A, 6 and 7A, respectively, or a beamsplitter that separates an incident light beam into more than three spectral bands through the compositing of multiple beamsplitter plates. A line image 7 of an original object is projected through an aperture 75 as shown in FIG. 8A by a lens 6 through the hypotenuse face of prism 1 such that the optical axis of the incident beam is normal to said face. Aperture 75 is constructed to block images from far away adjacent object lines about the principal object line 7 which would otherwise allow multiple separated images to strike the photosensors. The incident beam is separated into its three color components as previously described. The blue, red and green components emerge from the prism 1 as line images 8, 9 and 10, respectively. Since the individual path lengths of the color component beams through the beamsplitter 58 are identical, the said line images 8, 9 and 10 reside on a single plane which is perpendicular to the hypotenuse face of prism 1. The spatial separation of the three line images 8, 9 and 10, is determined by the glass plate spacing of the six dichroic coatings, 50, 52, and 54, on the beamsplitter plates 60, 62. By carefully tolerancing the individual thicknesses of beamsplitter plates 60, 62, the spatial separation of focused line images 8, 9 and 10 can be very accurately determined and maintained. This feature is particularly suited for trichromatic photodetection on said monolithic solid state photosensor 11 shown in FIG. 8A and 4A. Each line image, 8, 9 and 10, is electronically detected by one of three parallel spaced photosensors, 12, 13 and 14.

Figure 7B:
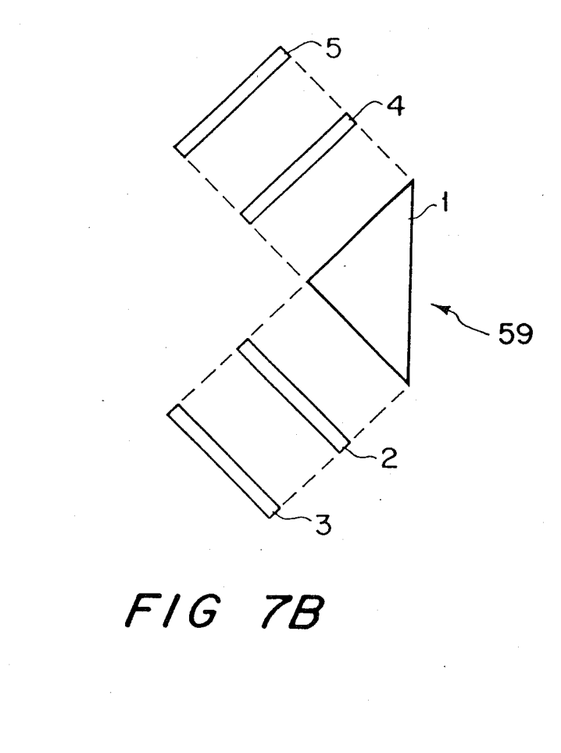
FIG. 7B shows an assembly view of the dual trichromatic beamsplitter with a prism.

An assembly view of the described trichromatic beamsplitter 59 is shown in FIG. 7B. The four beamsplitter plates 2, 3, 4, and 5 are oriented about prism 1 as shown and secured together with optical cement according to standard practice. Said optical cement is selected to have matching refractive index with the glass. Typical optical cements are polyester or acrylic based. In the assembly process it is important to minimize glue line thickness, preferrably micron to submicron glue films, to minimize random variation in the spacing of the dichroic coatings on the beamsplitter plates. This is typically accomplished by the application of heat and pressure to the composite structure during the adhesive process.

As shown in FIG. 7A, the dichroic coatings 50, 52, and 54 are separated by a distance X and the three focus line images 8, 9 and 10, are separated by $(\sqrt{2})(2x)$. The separation of the dielectric optical filters, 50, 52 and 54, is dominated by the glass plate thickness (the filter 50, 52 and 54 thickness is typically 3 um for standard dichroic coatings). Thus, the glass plate thickness principally determines the separation between image lines 8, 9 and 10. Variations in image lines 8, 9 and 10 separation are determined by variations in glass plate separation. For example, to maintain image lines 8, 9 and 10, a spacing tolerance of 7 um (one-half of standard 13 um photoelement) a glass plate thickness tolerance of 2.5 um (0.0001 inch) is required. Such glass thickness accuracy is available using conventional grinding and polishing procedures and equipment.

Figure 5B:
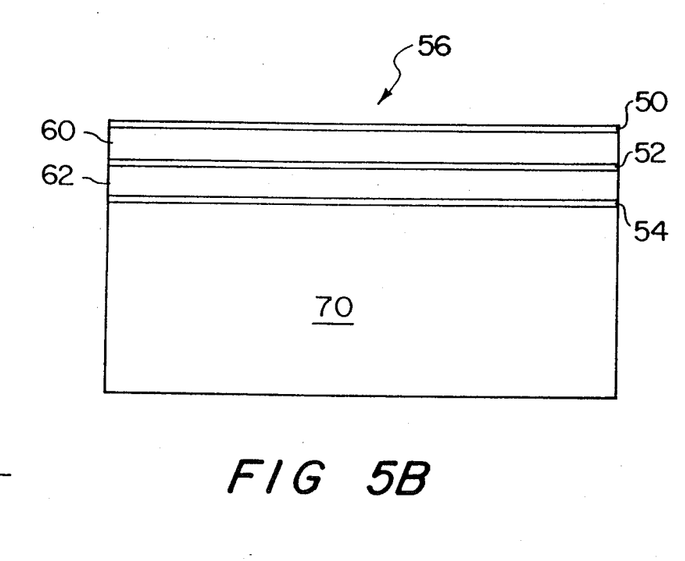
FIG. 5B shows a construction means for the trichromatic beamsplitter.

The color component's path length through the trichromatic beamsplitter 59 is $(2)^{\frac{1}{2}}A + 2(2)^{\frac{1}{2}}X$ where A is the dimension of a base side of prism 1, as shown in FIG. 7A. Reasonably small variations in the base and plate dimension can usually be handled by normal depth of focus characteristics of most lenses As previously indicated, the line images 8, 9 and 10 and photosensor arrays 12, 13, and 14 preferrably have matched spacing. Thus, the spacing between photosensor arrays 12, 13, and 14 should be $(\sqrt{2})(2x)$ when the spacing between the dichroic coatings 50, 52, 54 is x in beamsplitter 59 as shown in FIG. 7A. Thus, an array spacing of 1.0 mm requires a beamsplitter plate 60, 62, thickness of 0.35 mm. for beamsplitter 59. Under normal conditions, dichroic coatings 50, 52, and 54, applied to glass plates of such small thickness will cause a mild bowing of the glass plate. During the beamsplitter's 59 assembly, however, the bow can be removed by the plate's adherence and conformity to the rigid flat surface of the prism 1. Reasonable minimum array spacings for CCD photodiode arrays are about 0.2 to 0.3. Such minimum spacings dictate beamsplitter plates 60, 62, on the order of 0.07 to 0.2 mm. thick, depending on the beamsplitter embodiment utilized. To achieve these dimensions in manufacture, the previously described fabrication technique of FIG. 5B is recommended. It is obvious that said technique is applicable to all of the aforementioned trichromatic beamsplitter embodiments.

The profile view of FIG. 8A, has the appearance of a "projection" imaging apparatus. That is, a relatively long object line 7 is projected into smaller image lines 8, 9 and 10 via lens 6. In such a system, the photoelements 80 shown in FIG. 4B in the photosensor arrays 12, 13 and 14 must be proportionately smaller than the desired scanning resolution of the original. The advantages of such a "projection" type scanning device is the use of a small photosensor arrays 12, 13 and 14.

Figure 9:
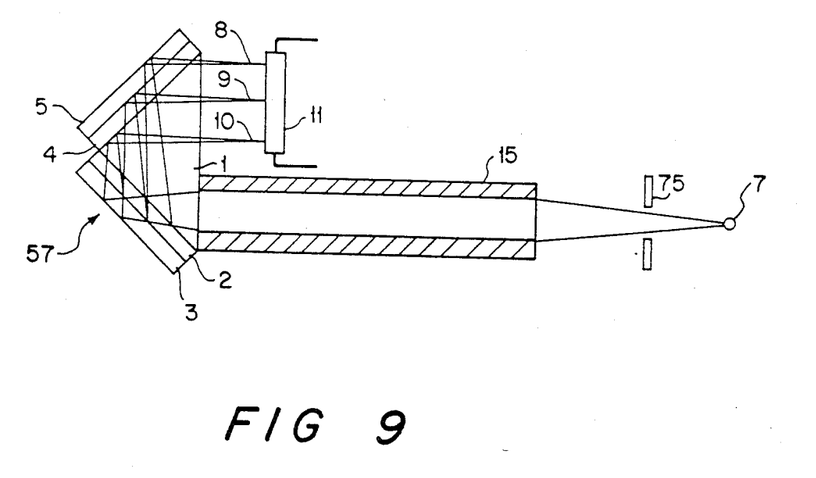
FIG. 9 shows an alternate embodiment of the invention.

The present invention is not limited to "projection" optics and, in fact, is quite extensible into other product and application forms In particular, the present trichromatic beamsplitter 59 and three linear array photosensor 11 can be packaged with a fiber array lens 15 to produce a "contact" type scan head 57, shown in FIG. 9. "Contact" type scan heads 57 principally use lenses with unity magnification. As such, the lens and sensor can be compacted in close proximity to the original. (The scan head does not actually contact the original as the name would imply.)

Fiber array lenses 15 are well known in the imaging field and are a product of Nippon Sheet Glass (Japan) under the name SelFoc Lens. The fiber array lenses 15 are available in small and long lengths such as page width. The fiber array lenses 15 are made of glass fibers of given length. Each fiber acts as an individual lens since chemical treatment varies the refractive index as a function of its radius. In this instance, the lens array 15 projects the line image of an original 7 through the trichromatic beamsplitter 59 to three linear array sensor 11. The length of the lens array 15, beamsplitter 59 (or other previously described beamsplitter embodiment) and photosensor 11, as it moves into the page in FIG. 9, is determined by the application: relatively long length for page width scanning (e.g., 8.5 inches long) or short lengths for "traversing" type scanning in which the scan head 57 is caused to traverse back and forth over the original object by an external mechanism. For equivalent scanning resolution, the contact (unity magnification) type scan head 57 shown in FIG. 9 requires proportionately less stringent tolerance on beamsplitter plates 2, 3, 4 and 5 thickness in comparison to the projection type scanner shown in FIGS. 8A and 8B. On the other hand, for equivalent scan width, the contact scanner 57 must be proportionately longer as measured by the ratio of the lens magnifications, unless the scan head 57 is traversed across the original.

A significant advantage of dichroic coatings 50, 52 and 54 over other filtration techniques is design versatility with respect to bandpass wavelengths and the slope and crossover characteristics of the band pass. Very sharp step function bandpass as well as controlled slope crossover with adjacent color bands is controlled by number of layers, material types, and coating layer thicknesses in a given filter. In the visible spectrum very clean bandpass discrimination can be achieved between red, green and blue or cyan, magenta and yellow. By contrast, conventional organic dye filters, as used in the prior art, are typically not as well-defined and usually have close band or multiple band filtration characteristics which ultimately prevents accurate color separation, usually due to undersaturation of a given detected trichromatic color.

The teachings of the present invention have been principally applied to color document scanning. Scanned document images, in this instance, are displayed on a color monitor. The accuracy of the color separation is judged by he likeness of the displayed image colors to that of the original document. To obtain color fidelity, the color separation must match the spectral characteristics of the individual red, green and blue phosphorus in the monitor display screen. This was successfully achieved by using dichroic beamsplitters 16 and 17 and a phosphor-tailored fluorescent lamp 22 in a test apparatus, depicted in FIG. 10. The test apparatus utilizes three single linear array CCD photosensors 18, 19 and 20 (Toshiba TCD 102C-1) with a 2048 element array.

Figure 10:
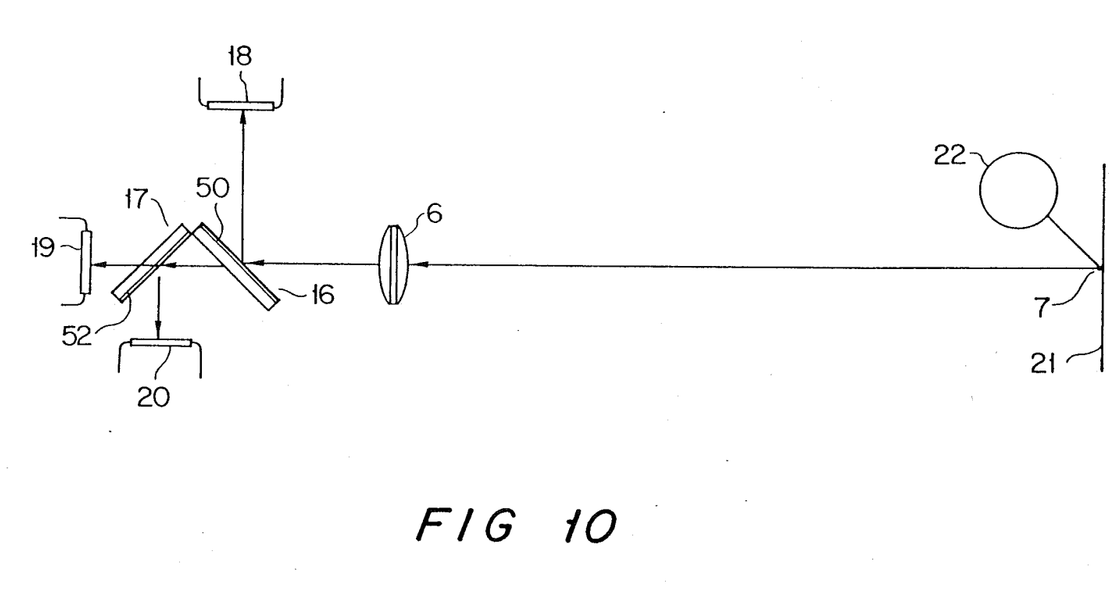
FIG. 10 is a test apparatus for the filters.

In FIG. 10, a fluorescent light source 22 illuminates the surface of an original document 21. A line image of the original 7 is projected onto a beamsplitter assembly, consisting of dichroic beamsplitters 16 and 17, by lens 6.

Beamsplitters 16 and 17 are flat glass plates coated on one side with dichroic coatings 50 and 52, respectively. Beamsplitter 16 is designed to reflect blue light while transmitting red and green spectral bands. The blue light is reflected to a first CCD linear-array photosensor 18, with beamsplitter 16 tilted at 45 degrees in this example, although other angles are possible, to Beamsplitter 17 reflects red light to a second CCD photodiode array sensor 20. The beamsplitter plates are Optical Coating Lab commercial blue and red 45 degree Dichroic Color Separation Filters although other filters are possible. The green line image passing through both beamsplitter plates is captured by the third CCD photodiode array sensor 19. Beamsplitter plate 17 is also aligned at 45 degrees in this example, although other angles are possible, as shown.

Figure 11:
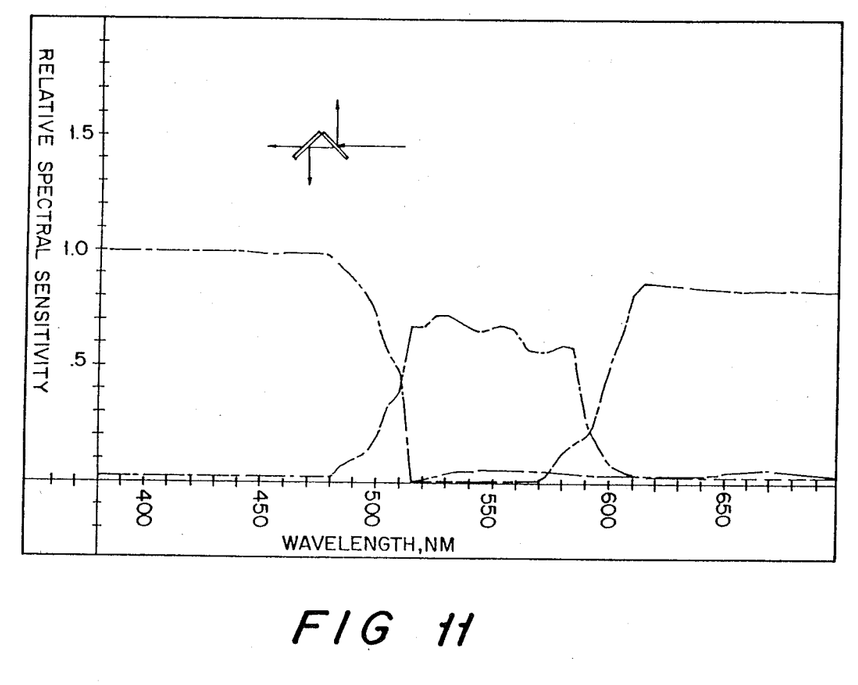
FIG. 11 is the spectral transmission of the filters in FIGS. 2A and 2B.
Figure 12:
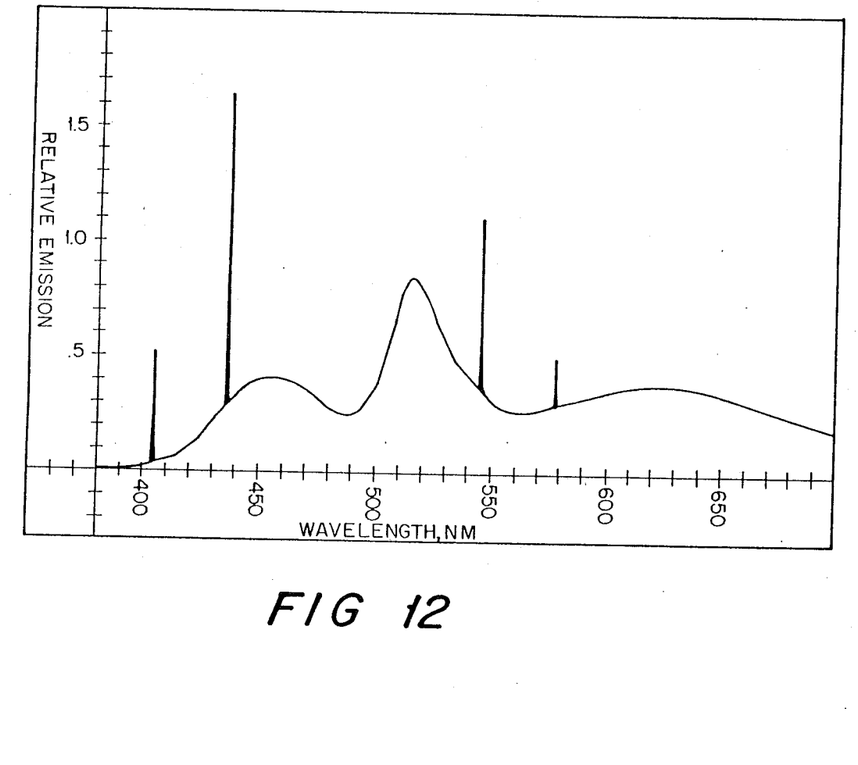
FIG. 12 is the output of the lamp tailored to the spectral transmission shown in FIG. 11.

The band pass characteristics of the collective beamsplitter assembly of FIG. 10 is shown in FIG. 11. Although the crossover wavelengths between color bands is clean and spectrally accurate for separation, the reflected bands do not share the spectral shape and balance of the output device's color palette. Output devices include monitors and hard copy devices Spectral accuracy, in this case, is most easily provided by spectrally tailoring the light source 22. Fluorescent lamp phosphors can be blended to achieve a wide variety of spectra. The spectral bandpass characteristics of the dichroic coatings 50, 52, can be used to choose phosphors of the lamp 22 so that the color separation of the coatings 50, 52 will match the monitor's display phosphors. The result of the HP Color Model study was a lamp specification used by Sylvania Lamp to prototype a scanner lamp source 22. The prescribed phosphor recipe (from Hewlett-Packard Company) and the spectra of the prototype lamp, as made and measured by Sylvania, is shown in FIG. 12.

The spectra of the spectrally-tailored fluorescent lamp as separated by the dichroic beamsplitters 16 and 17 and detected by CCD photodiode arrays 18, 19 and 20, produce a color gamut nearly equivalent to standard monitor phosphor output.

I claim:

1. An apparatus for separating electromagnetic waves according to wavelength comprising:
    a first transparent layer;
    a first dichroic coating contiguous with the first side of said first transparent layer for reflecting said electromagnetic waves having said wavelength within a first range; and
    a second dichroic coating contiguous with the second side of said first transparent layer for reflecting said electromagnetic waves having said wavelength within a second range.

2. An optical device for spatially and spectrally separating an input optical beam into a plurality of optical beams such that each of said plurality of optical beams has a predetermined spectral range and optical axes that have optical path lengths that are substantially equal between two planes that are substantially normal said plurality of optical beams and said input optical beam, said optical device comprising:
    first composite dichroic means disposed at a first predetermined angle of incidence to said input optical beam for spatially and spectrally separating said input optical beam into said plurality of optical beams so that each of said plurality of optical beams has a predetermined spectral range and is directed in substantially the same direction;
    second composite dichroic means disposed at a second predetermined angle of incidence to said plurality of optical beams for equalizing said optical path lengths of said optical axes of each of said plurality of optical beams between said surfaces.

3. The optical device of claim 2 wherein said input optical beam comprises a point source.

4. The optical device of claim 2, wherein said input optical beam comprises a line scan.

5. The optical device of claim 2 wherein said input optical beam comprises an area scan.

6. The optical device of claim 2 wherein said first predetermined angle of incidence and said second predetermined angle of incidence are substantially equal.

7. The optical device of claim 2 wherein said first and second composite dichroic means comprise:
    optical spacer means for providing a substantially optically transparent medium having a predetermined thickness;
    first dichroic layer means disposed on a first side of said optical spacer means for reflecting light having a first predetermined spectral range and transmitting light outside of said first predetermined spectral range;
    second dichroic layer means disposed on a second side of said optical spacer means for reflecting light having a second predetermined spectral range and transmitting light outside of said second predetermined spectral range;
    reflector means disposed a predetermined distance from, and essentially parallel to, said optical spacer means for reflecting light transmitted by said first dichroic layer means and said second dichroic layer means.

8. The optical device of claim 7 wherein said predetermined thickness of said optical spacer means is substantially equal to said predetermined distance between said reflector means and said optical spacer means.

9. The optical device of claim 7 further comprising optical gluing means disposed between said reflector means and said optical spacer means, for securing said optical spacer means in a position substantially parallel to said reflector means.

10. The optical device of claim 9 wherein said optical gluing means has an index of refraction of said optical spacer means.

11. The optical device of claim 7 wherein said predetermined distance between said reflector means and said optical spacer means is proportional to the difference in the index of refraction of said optical spacer means and the index of refraction of a substance filling the space between said reflector means and said optical spacer means.

12. The optical device of claim 2 wherein said first and second composite dichroic means comprise:
    first dichroic layer means supported by substantially optically transparent support means for reflecting light from said input optical beam having a first predetermined spectral range and transmitting light outside of said first predetermined spectral range;
    at least one additional dichroic layer means supported by at least one additional substantially optical transparent support means for reflecting light having at least one additional predetermined spectral range and transmitting light outside of said additional predetermined spectral ranges.

13. The optical device of claim 12 wherein said first and second composite spectral separator means further comprise:

reflector means disposed to reflect light transmitted by said additional dichroic layer means.

14. The optical device of claim 2 wherein said first and second composite dichroic means comprise:

substantially optically transparent support means for providing a substantially optically transparent support medium;

dichroic layer means disposed on said substantially optically transparent support means for reflecting light from said input beam within predetermined spectral ranges and transmitting light outside of said predetermined spectral ranges.

15. The optical device of claim 14 wherein said first and second composite spectral separator means further comprise;

optical spacer means for providing substantially optically transparent media having predetermined thicknesses;

dichroic layer means disposed on two surfaces of said optical spacer means for reflecting light having predetermined spectral ranges and transmitting light outside of said predetermined spectral ranges.

16. The optical device of claim 2 wherein said first and second composite spectral separator means comprise:

optical spacer means for providing substantially optically transparent media having predetermined thickness;

dichroic layer means disposed on two substantially parallel surfaces of said optical spacer means for reflecting light having predetermined spectral ranges and transmitting light outside of said predetermined spectral ranges.

17. An optical device for spatially and spectrally separating an optical beam comprising:

first dichroic layer means disposed along a first plane for reflecting light from said optical beam having a first predetermined spectral range along a first optical axis;

a plurality of additional dichroic layer means disposed substantially parallel to said first plane for reflecting light from said optical beam having a plurality of additional spectral ranges along a plurality of additional optical axes such that said first optical axis and each of said additional optical axes are spaced by an amount determined by the spacing between said first dichroic layer means and each of said plurality of additional dichroic layer means.

18. The optical device of claim 17 further comprising:

means for orienting said first dichroic layer means and said plurality of additional dichroic layer means at a predetermined angle of incidence to said optical beam such that said first optical axis and each of said additional optical axes are spaced by an amount that is further determined by said predetermined angle.

19. The optical device of claim 17 further comprising:

support means for maintaining said first dichroic layer means in said first plane and said plurality of additional dichroic layer means disposed substantially parallel to said first plane, said support means having a predetermined index of refraction such that said first optical axis and each of said additional optical axes are spaced by an amount that is further determined by said indexed of refraction of said support means.

20. An optical device for spatially and spectrally separating an optical beam having a plurality of spectral components into a plurality of optical beams having predetermined spectral ranges of said spectral components and substantially parallel optical axes that are spaced by predetermined optical axes distances comprising:

first dichroic layer means disposed along a first plurality of parallel planes that are spaced by first predetermined parallel plane distances for reflecting said plurality of predetermined spectral components to form said plurality of optical beams that are spatially and spectrally separated;

second dichroic layer means disposed along a second plurality of parallel planes that are spaced by second predetermined parallel plane distances for reflecting said plurality of optical beams reflected from said first dichroic layer means to form said plurality of optical beams having said predetermined spectral ranges and substantially parallel optical axes that have substantially equal optical path lengths and that ares spaced by said predetermined optical axes distances such that said predetermined optical axes distances are determined by said first and second predetermined parallel plane distances.

21. The optical device of claim 20 further comprising:

means for orienting said first dichroic layer means along said first plurality of parallel planes that are oriented at a first predetermined angle of incidence to said optical beam, and means for orientating said second dichroic layer means along said second plurality of parallel planes that are oriented at a second predetermined angle of incidence to said plurality of optical beams that are reflected from said first dichroic layer means;

whereby said first and second predetermined angles of incidence further determine said predetermined optical axes distances.

22. The optical device of claim 21 further comprising means for maintaining said first and second dichroic layer means in a predetermined orientation such that said first and second predetermined parallel plane distances are essentially equal and said first and second predetermined angles of incidence are essentially equal.

* * * * *